United States Patent [19]

Harada

[11] Patent Number: 5,072,258

[45] Date of Patent: Dec. 10, 1991

[54] METHOD OF CONTROLLING SURFACE POTENTIAL OF PHOTOCONDUCTIVE ELEMENT

[75] Inventor: Masahide Harada, Tokyo, Japan

[73] Assignee: Ricoh Company, Ltd., Tokyo, Japan

[21] Appl. No.: 563,344

[22] Filed: Aug. 7, 1990

[30] Foreign Application Priority Data

Aug. 7, 1989 [JP] Japan .................................. 1-204163

[51] Int. Cl.[5] ........................ C03G 15/00; C03G 15/04

[52] U.S. Cl. .................................... 355/208; 355/216; 355/246; 355/77

[58] Field of Search ................. 355/219, 216, 246, 77, 355/208; 430/902, 937

[56] References Cited

U.S. PATENT DOCUMENTS 3,611,982 10/1971 Coriale et al. .................. 355/246 X
4,050,806 9/1977 Miyakawa et al. ............ 355/208 X
4,087,171 5/1978 Yano ............................... 355/246 X
4,194,828 3/1980 Holz et al. ...................... 355/246 X
4,348,099 9/1982 Fantozzi ......................... 355/208 X
4,511,240 4/1985 Suzuki et al. ....................... 355/246

*Primary Examiner*—R. L. Moses
*Attorney, Agent, or Firm*—Oblon, Spivak, McClelland, Maier & Neustadt

[57] ABSTRACT

A method of controlling the surface potential of a photoconductive element included in an electrophotograpic copier or similiar image forming apparatus. When the background area of a photoconductive element is contaminated due to the shaving of the photoconductive film provided on the photoconductive element or similar type of cause, the method increases the amount of light for imagewise exposure. When the contamination is ascribable to residual potential on the surface of the photoconductor element, the method increases bias potential for development and charge potential. The method, therefore, adequately controls the background contamination ascribable to the change in the sensitivity of the photoconductive element which is in turn ascribable to different types of causes, i.e., the increase in the residual potential and the shaving of the photoconductive film or the like.

3 Claims, 5 Drawing Sheets

METHOD OF CONTROLLING SURFACE POTENTIAL OF PHOTOCONDUCTIVE ELEMENT

BACKGROUND OF THE INVENTION

The present invention relates to an image forming apparatus such as an electrophotographic copier and, more particularly, to a method of controlling the surface potential of a photoconductive element for adequately controlling the contamination of the background area of the element ascribable to the increase in residual potential on the surface of the element and to the shaving of a photoconductive film provided on the element or similar cause.

A photoconductive element or image carrier for use in an electrophotographic copier or similar image forming apparatus usually has a photoconductive layer in the form of an organic semiconductor (OPC) on the surface thereof. Such a photoconductive element allows charge to accumulate thereon and thereby allows a potential to remain thereon due to fatigue as a copying cycle is repeated, despite that the surface of the element is discharged by light, for example, as well known in the art. The residual potential on the photoconductive element and, therefore, the potential in the background area of the element increases with the increase in the number of copies produced, i.e. the number of times that the copying cycle is repeated. When the residual potential increases to a given value, it causes the background area of the photoconductive element to be contaminated. The strength of the photoconductive film is relatively low and, depending on the conditions of use, the thickness is altered so that the sensitivity of the photoconductive element is changed. This is another cause of the contamination in the background area.

To eliminate the contamination ascribable to the increase in the residual potential as stated above, there has been proposed a method which senses the potential of the background area and, based on the sensed potential, adjusts one or more of the charge potential for charging the surface of the photoconductive element, the amount of light for illuminating the charged surface of the element, and the bias voltage applied to a developing unit which develops a latent image electrostatically formed on the element. For example, Japanese patent laid-open publication No. 201067/1984 discloses a method which senses the residual potential on the photoconductive element and corrects the bias potential and the amount of light on the basis of the sensed potential. Japanese patent laid-open publication No. 76546/1982 teaches a method which forms a toner image representative of a reference pattern having a reference density on the photoconductive element, generates a signal associated with the density of the toner image, and feeds it back to the charge potential and the amount of light. Japanese patent laid-open publication No. 191161/1988 shows and describes a method which compensates for the fatigue of the photoconductive element by controlling the charge potential and the amount of light in matching relation to the fatigue and idle time of the photoconductive element. Further, U.S. Pat. No. 4,870,460 discloses a method which discharges the residual potential on the surface of the photoconductive element except for the image area, develops the residual potential remaining after the discharge by a bias voltage which is lower than the bias voltage adapted for the reproduction of a document image, senses the density of the resulting visible pattern, and corrects, in response to the sensed density, at least one of the charge potential, exposing potential, and bias potential at the time of forming a document image. With any of these methods, it is possible to reproduce an image which has little suffered from the influence of background contamination.

However, the problem is that the contamination in the background area is derived from two different kinds of causes, i.e., the increase in the background potential due the residual charge, or residual potential, on the surface of the photoconductive element, and the change in the sensitivity of the element due to changes in the thickness of the OPC film or the like, as mentioned earlier. The two different kinds of causes each needs a different remedy. Specifically, when the residual charge accumulates, the background potential will not lower even if the amount of light is increased and, therefore, it is necessary to increase the charge potential and the bias potential for development to thereby lower the background potential. On the other hand, when the sensitivity of the photoconductive element is changed due to, for example, the changes in the thickness of the photoconductive film, the background potential will readily lower only if the amount of light is increased. Moreover, these two causes, in practice, increase the background potential in combination and thereby aggravate the complicated control over the background contamination. Another problem with the prior art implementations is that they simply adjust the amount of light, bias potential or charge potential in such a manner as to reproduce a predetermined image without making distinction between the different types of causes of the increase in background potential, failing to control the contamination satisfactorily.

SUMMARY OF THE INVENTION

It is therefore an object of the present invention to provide a method of controlling the surface potential of a photoconductive element while coping with the background contamination ascribable to the increase in the residual potential on the element and to the change in the sensitivity of the element ascribable to changes in the thickness of a photoconductive film of the element.

It is another object of the present invention to provide a generally improved method of controlling the surface potential of a photoconductive element.

In accordance with the present invention, in an image forming apparatus having a charging unit for charging a surface of the photoconductive element, an exposing unit for electrostatically forming a latent image representative of a document on the charged surface of the photoconductive element, a developing unit for transforming the latent image into a toner image, an image transferring unit for transferring the toner image to a paper sheet, a cleaning unit for removing toner particles remaining on the photoconductive element after image transfer, and a discharging unit for discharging the surface of the photoconductive element, a method for controlling the surface potential of the photoconductive element comprises the steps of (a) preparing a sensor for sensing a potential of a background area of the surface of the photoconductive element, (b) causing the sensor to sense a potential of the background area of the surface of the photoconductive element, (c) increasing, when the sensed potential is greater than a predetermined reference value, an amount of light to be emitted from the exposing unit and causing the sensor to sense a potential again, (d) setting, when the potential sensed in step (b) is smaller than the reference value, the potential as a new reference value, and (e) increasing, when the potential sensed in step (b) is greater than the reference value, a charge potential of the charging unit and a bias potential for development of the developing unit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, conventional implementations for the control of the surface potential of a photoconductive element will be described first.

A photoconductive element or image carrier for use in an electrophotographic copier or similar image forming apparatus has a photoconductive layer in the form of an OPC film on the surface thereof. With such a photoconductive element, it is likely that residual charge accumulates on the surface thereof and the photoconductive film is thinned or changed, as stated earlier. This leads to the contamination id the background area of the photoconductive element as well as to the change in sensitivity.

Figure 1:
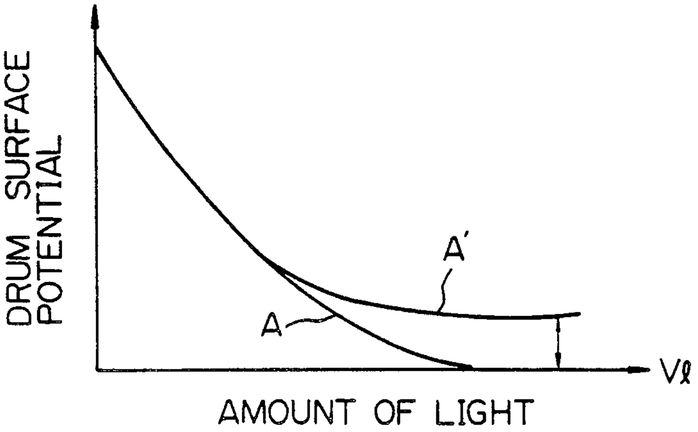
FIG. 1 shows a variation in the sensitivity of the surface potential of a photoconductive element to the amount of light occurring when the background is contaminated by residual potential.

FIG. 1 shows curves each representing the sensitivity of the surface potential of the photoconductive element to the amount of light adapted for imagewise exposure. As shown, the background contamination is ascribable to the variation in the sensitivity of OPC due to aging. At first, the sensitivity of OPC is such that the surface potential decreases in proportion to the amount of light and reaches a given background potential Vl as the amount of exposure increases beyond a predetermined value, as represented by a curve A. However, the sensitivity of OPC varies due to aging as OPC is repetitively used, although the variation depends on the frequency of use. Specifically, the surface potential fails to lower to the background potential Vl despite the increase in the amount of light, i.e., it settles at a given potential or residual potential Vr, as represented by a curve A'. In this condition, charge remains on OPC to prevent the surface potential from varying in proportion to the amount of light as the amount of light exceeds a certain value. The residual potential increases the background potential with the result that contamination occurs in the background area in the event of image forming operations. On the other hand, when the photoconductive element is shaved, for example, the sensitivity is changed from one represented by a curve B in FIG. 2 to the other represented by a curve B'. Therefore, it is necessary to increase the amount of light from L to L' so that the surface potential may lower to the initial background potential Vl.

Figure 3:
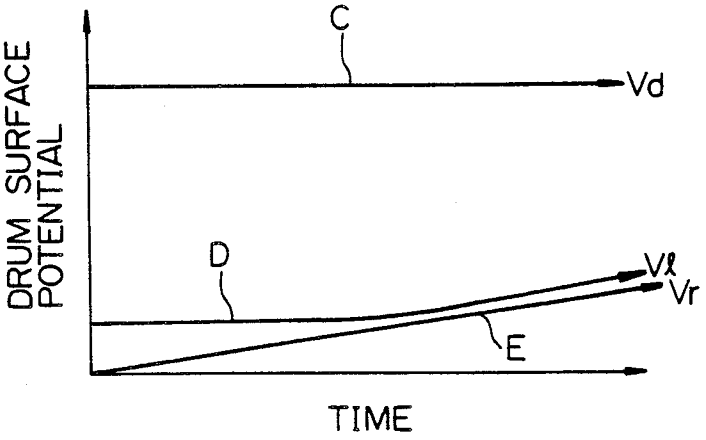
FIG. 3 shows variations in the potential in an image area, background potential, and residual potential due to aging and which occur when residual charge accumulates on the photoconductive element.
Figure 4:
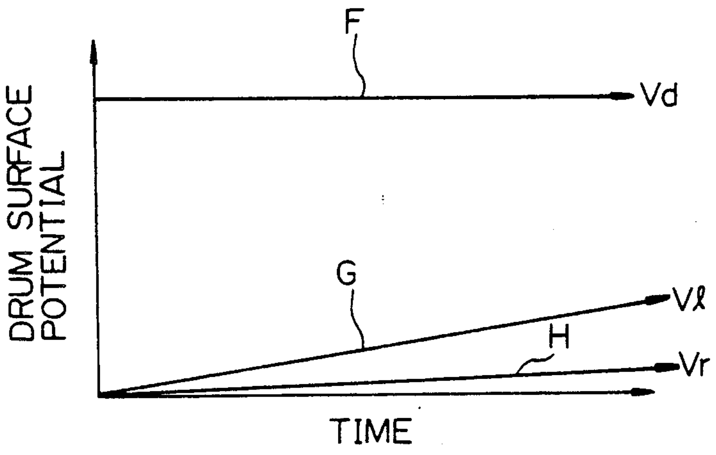
FIG. 4 shows variations similar to those of FIG. 3 and caused by changes in the thickness of the photoconductive film or similar cause.

FIG. 3 shows a line C representative of a variation in the potential Vd of the image area, a line D representative of a variation in the potential Vl of the background area, a line E representative of a variation in the residual potential Vr, each occurring when residual charge has accumulated on the surface of the photoconductive element. FIG. 4 shows a line F representative of a variation in the potential Vd of the image area, a line G representative of a variation in the potential Vl of the background area, and a line H representative of a variation in the residual potential Vr, each occurring when the thickness photoconductive film has been changed. In the case of an electrophotographic copier, for example, the individual variations due to the residual charge and the thickness are generally effected by the number of copies per unit time, i.e. the number of times that the copying cycle is repeated during a predetermined period of time. The variations shown in FIG. 3 occur when the number of copies per month is great, while the variations shown in FIG. 4 occur when the number of copies is small such as several to several ten copies per day. In any case, the background potential Vl increases due to aging to contaminate the background area.

As stated above, the contamination, i.e., the increase in the potential of the background area is brought about when residual charge accumulates and when the photoconductive film is shaved to change the sensitivity of the element. Some measure, therefore, has to be taken to lower the background potential. In practice, the measure depends on the type of cause of the increase in the background potential. Regarding the residual potential, the charge potential and bias potential have to be increased to lower the background potential since, as shown in FIG. 1, the background potential Vl will not decrease despite the increase in the amount of light. Regarding the variation in sensitivity, the background potential Vl will readily decrease only if the amount of light is increased from L to L'. In such a situation, it is difficult to lower the background potential by a single implementation. Moreover, the above two types of causes are usually mixed together, aggravating the intricacy of control.

A control method embodying the present invention and which is free from the above problem will be described hereinafter.

Figure 5:
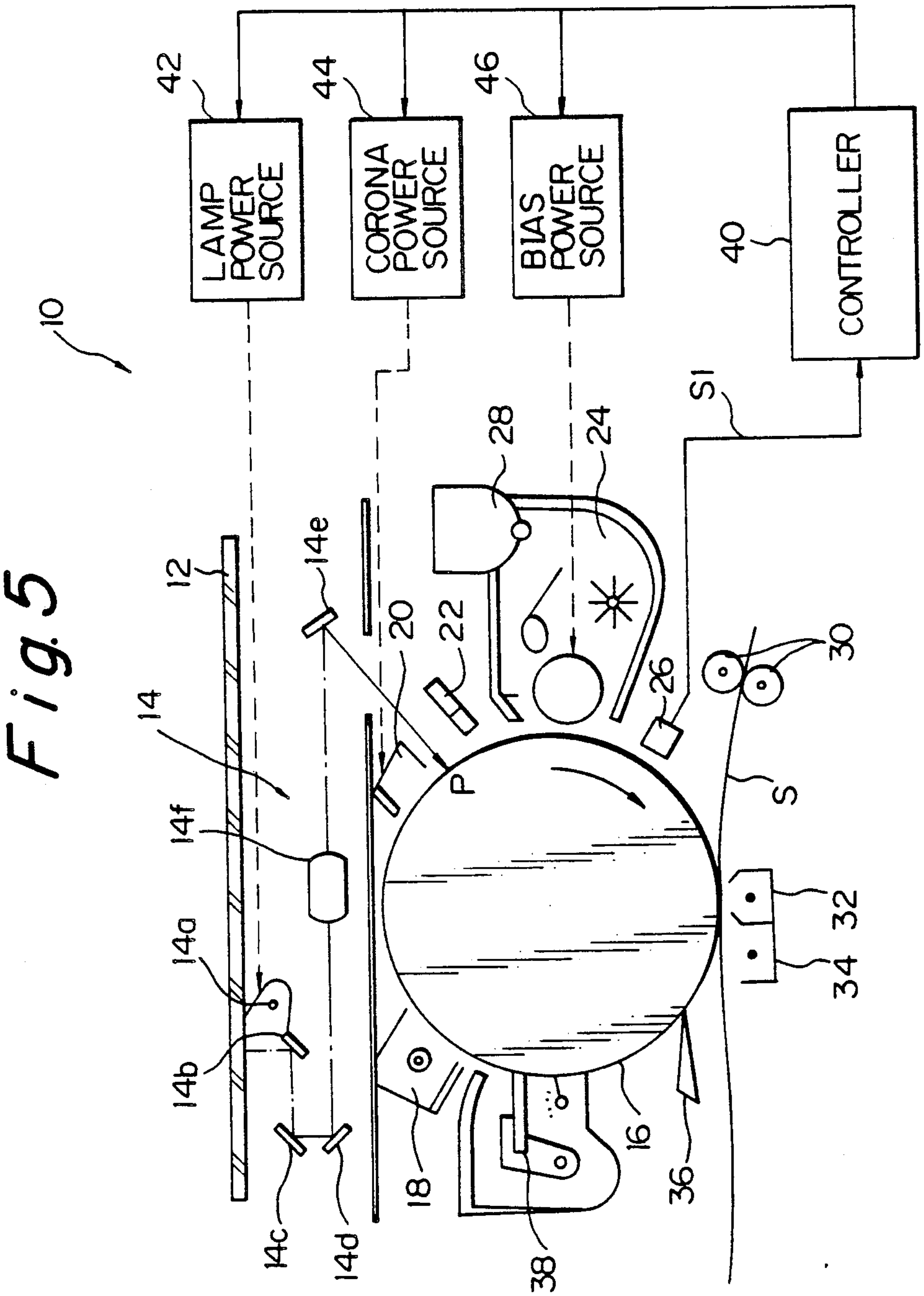
FIG. 5 is a section schematically showing an electrophotographic copier representative of an image forming apparatus to which the present invention is applicable.

Referring to FIG. 5, a copier belonging to a family of image forming apparatuses with which the present invention is practicable is shown and generally designated by the reference numeral 10. The copier 10 has a glass platen 12 to be loaded with a document, not shown. Disposed below the glass platen 12 is optics 14 which is made up of a light source **14*a* movable over at least the entire length of the document, mirrors 14*b*, 14*c*, 14*d* and 14*e* for steering an imagewise reflection from the document, and a lens 14*f*. The optics 14 focuses the imagewise reflection from the document onto an exposing position P on the surface of a photoconductive element 16. In this case, the photoconductive element 16 is implemented as a drum. A discharging unit 18 and a charging unit 20 are located upstream of the exposing position P with respect to an intended direction of rotation of the drum 16. The discharging unit 18 dissipates the charge deposited on the drum 16, while the charging unit 20 uniformly charges the drum 16 and is implemented with a corotron, scorotron or similar corona discharger. Located downstream of the exposing position P are an eraser 22, a developing unit 24, and a surface potential sensor 26. The eraser 22 adjusts the potential of the drum 16 to form the background area associated with the document thereon. The developing unit 24 deposits a toner on the drum 16. The surface potential sensor 26 senses the surface potential of the drum 16 after the development effected by the developing unit 24 and serves as a background potential sensor as well. The developing unit 24 includes a toner supply device 28 for supplying a fresh toner as needed. A paper sheet S is fed by a feed roller pair 30 to a position where it will contact the drum 16. A transfer charger 32 is positioned below the drum 16 for charging the paper sheet S to polarity opposite to that of the toner, so that the toner is transferred from the drum 16 to the paper sheet S. A separation charger 34 is also located below the drum 16 for separating the paper sheet S carrying the toner thereon from the drum 16. A pawl 36 helps the separation charger 34 surely separate the paper sheet S from the drum 16. A cleaning unit 38 is disposed upstream of the discharging unit 18 to remove toner particles which remain on the drum 16** after the image transfer.

A controller 40 controls a power source 42, a power source 44, and a power source or bias power source 46 which power the light source 14*a*, charging unit 20, and developing unit 24, respectively. Specifically, in response to an output signal S1 of the surface potential sensor 26, the controller 42 delivers control signals S2 to the power sources 42, 44 and 46. Implemented as an optical sensor, the surface potential sensor 26 senses the surface potential of the drum 16 in terms of the amount of reflection from a toner image formed on the drum 16 by the toner which is deposited in association with the surface potential, i.e. in terms of toner density.

Figure 6:
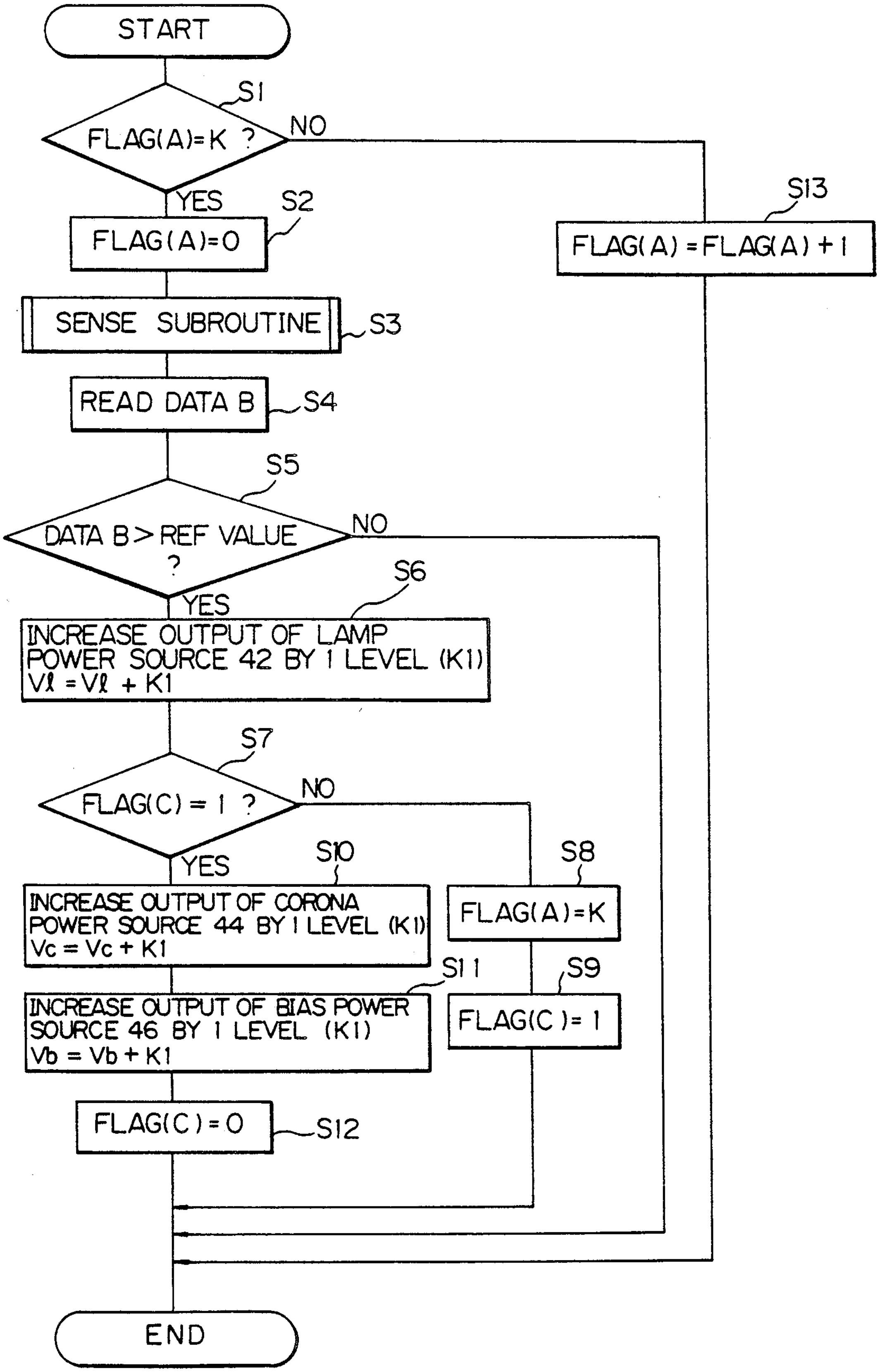
FIGS. 6 and 7 are flowcharts showing a specific operation flow which is executed by a controller shown in FIG. 5.
Figure 7:
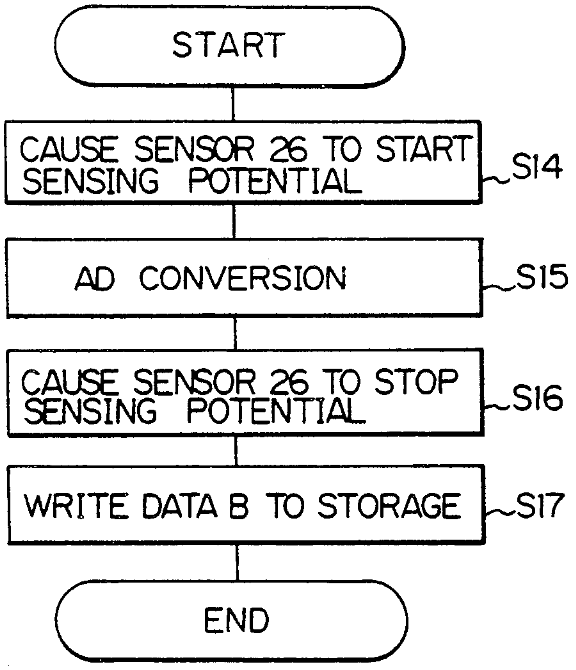

Referring to FIGS. 6 and 7, a specific operation flow executed by the controller 40 for controlling background contamination will be described. First, the operator lays a reference document on the glass platen 12 and then selects an exclusive control mode for coping with background contamination. Then, the controller 40 sets a flag (A) to a predetermined value K which is representative of the exclusive control mode, while setting a flag (C) to ZERO. The flag (C) will be described specifically later. The optics 14 illuminates the reference document and steers the resulting reflection toward the drum 16 which has been uniformly charged by the charging unit 20. As a result, a latent image representative of the reference document is formed on the drum 16. The latent image is developed by the developing unit 24 to become a toner image. As the toner image on the drum 16 reaches the position where the surface potential sensor 26 is located, the controller 40 executes a sequence of steps S1 to S17 shown in FIGS. 6 and 7, as follows.

S1: The controller 40 checks the flag (A) to see if the control mode has been selected. If the answer is positive (Y), meaning that the control mode has been selected, the program advances to a step S2; if otherwise, it advances to a step S13.

S2: The controller 40 sets the flag (A) to ZERO.

S3: The controller 40 executes a sense subroutine which is shown in FIG. 7. By the sense suroutine made up of steps S14 to S17, the controller 40 controls the surface potential sensor 26 to write the background potential (data B) to a predetermined storage.

S4: The controller 40 reads the data B out of the storage.

S5: The controller 40 compares the data B with a predetermined reference value. If the data B is greater than the reference value, the controller 40 executes a step S6; if otherwise, it ends the processing.

S6: The controller 40 increases the output Vg of the lamp power source 42 by one level ($K_1$).

S7: The controller 40 executes a step S10 if the flag (C) is ONE or a step S8 if otherwise. Stated another way, the controller 40 executes the step S10 if the data B is greater than the reference value even after the surface potential sensor 26 has sensed the surface potential twice.

S8: The controller 40 sets the flag (A) to K.

S9: The controller 40 sets the flag (C) to ONE to thereby cause the surface potential sensor 26 to sense the background potential again.

S10: The controller 40 increases the output Vc of the corona power source 44 by one level ($K_2$).

S11: The controller 40 increases the output Vb of the bias power source 46 by one level ($K_3$).

S12: The controller 40 sets the flag (C) to ZERO and thereby ends the processing.

S13: The controller increases the value of the flag (A) by 1 (one) and ends the processing.

It is to be noted that the step S13 is omissible when this control mode is manually selected on the input unit only. Specifically, assuming that the predetermined value K is 1000, then increasing the value of the flag (A) in the step S13 will allow the control mode to commense automatically when the flag (A) reaches 1000 (K). Stated another way, the step S13 is incorporated to effect the control automatically every time the copying cycle is repeated a predetermined number of times.

Figure 2:
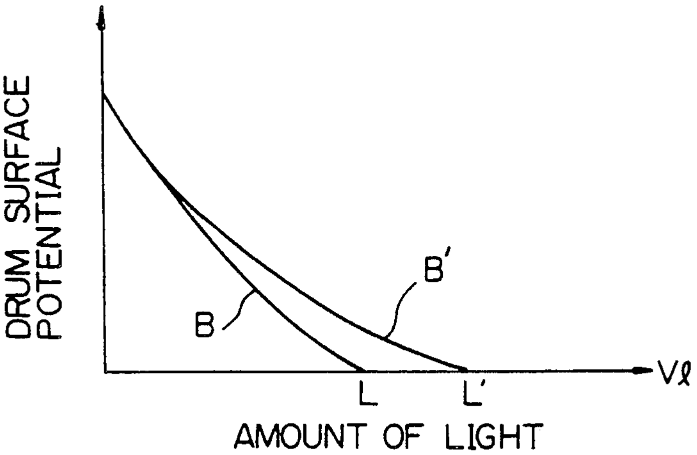
FIG. 2 shows a variation of the same which occurs when the background is contaminated due to a change in the sensitivity ascribable to, for example, changes in the thickness of a photoconductive film of the photoconductive element.

When the background is contaminated due to the change in sensitivity which is ascribable to thickness changes of the film, for example, the relation between the surface potential and the amount of light varies as represented by the curve B' in FIG. 2. The contamination will, therefore, be eliminated if the amount of light is increased. When the contamination is ascribable to the residual potential, the above-mentioned relation varies as represented by the curve A' in FIG. 1. Then, the contamination will be eliminated if the charge potential and the bias potential for development are increased.

First, the previously stated control mode is selected, and then exposure and development are effected with the reference document. As the toner image reaches a predetermined position, the controller 40 determines whether or not the control mode has been selected. If it has been selected, the controller 40 controls the surface potential sensor 26 to sense the background potential (data B). The controller 40 compares the sensed background potential with the reference value to see if the background has been contaminated. If the background potential is equal to or smaller than the reference value, meaning that the background is free from cntamination, the controller 40 ends the processing. If the background potential is greater than the reference value, meaning that the background has been contaminated, the controller 40 increases the output of the lamp power source 42 so as to illuminate the reference document with a greater amount of light. Then, the controller 40 controls the sensor 26 again in order to measure the background potential. In the case that the contamination is brought about by the thinning or similar type of cause, the background potential determined by the second sensing will have been lowered to or below the reference value. Then, the controller 40 ends the processing. On the other hand, when the contamintion is ascribable to the residual potential, the increased amount of light alone cannot lower the background potential and, hence, the background potential will still be greater than the reference value to cause the contamination to be detected again. Stated another way, when detected the contamination again, the controller 40 determines that the residual potential exists and thereby increases the charge potential and the bias potential for development. This is successful in eliminating the contamination due to residual charge.

In summary, in accordance with the present invention, when the background is contaminated by the shaving of a photoconductive film or similar type of cause which is apt to occur when the number of copies produced per unit time is small, the amount of light for imagewise exposure is increased to eliminate the contamination. When the contamination is ascribable to residual potential which occurs when the number of copies per unit time is great, the bias potential for development and the charge potential are increased to eliminate it. Should the charge potential be not increased together with the bias potential, the difference between the potential of the image area and the bias potential and, therefore, the copy density would be lowered when the bias potential is increased. More specifically, the charge potential is increased by an equivalent amount to the bias potential to insure the difference between the image area potential and the bias potential, thereby maintaining the copy density constant.

The present invention, therefore, insures the production of attractive images at all times by freeing the background from contamination ascribable to different types of causes which are derived from the different frequencies of the copying cycle.

Various modifications will become possible for those skilled in the art after receiving the teachings of the present disclosure without departing from the scope thereof.

What is claimed is:

1. A method of controlling surface potential of a photoconductive element included in an image forming apparatus which comprises charging means for charging a surface of said photoconductive element, exposing means for electrostatically forming a latent image representative of a document on said charged surface of said photoconductive element, developing means for transforming said latent image into a toner image, image transferring means for transferring said toner image to a paper sheet, cleaning means for removing toner particles remaining on said photoconductive element after image transfer, and discharging means for discharging said surface of said photoconductive element, said method comprising the steps of:

(a) preparing sensing means for sensing a potential of a background area of the surface of the photoconductive element;

(b) causing said sensing means to sense a potential of the background area of the surface of the photoconductive element;

(c) increasing, when the sensed potential in step (b) is greater than a predetermined reference value, an amount of light to be emitted from said exposing means and causing said sensing means to sense a potential again;

(d) setting, when the potential sensed in step (b) is smaller than the reference value, said increased amount of light as a new amount of light to be emitted; and (e) increasing, when the potential sensed in step (b) is greater than the reference value, a charge potential of the charging means and a bias potential for development of the developing means.

2. A method as claimed in claim 1, wherein said sensing means optically senses a potential of the background area of the photoconductive element.

3. A method as claimed in claim 1, wherein said charge potential in step (e) is increased by an equivalent amount to said bias potential.

* * * * *